(12) United States Patent
Berry et al.

(10) Patent No.: US 8,133,463 B1
(45) Date of Patent: Mar. 13, 2012

(54) PYROCHLORE-TYPE CATALYSTS FOR THE REFORMING OF HYDROCARBON FUELS

(75) Inventors: David A. Berry, Morgantown, WV (US); Dushyant Shekhawat, Morgantown, WV (US); Daniel Haynes, Morgantown, WV (US); Mark Smith, Morgantown, WV (US); James J. Spivey, Baton Rouge, LA (US)

(73) Assignee: The United States of America as represented by the Department of Energy, Washington, DC (US)

( * ) Notice: Subject to any disclaimer, the term of this patent is extended or adjusted under 35 U.S.C. 154(b) by 338 days.

(21) Appl. No.: 12/422,346

(22) Filed: Apr. 13, 2009

Related U.S. Application Data (60) Provisional application No. 61/044,537, filed on Apr. 14, 2008.

(51) Int. Cl.
*C01B 31/18* (2006.01)
*C01B 3/26* (2006.01)

(52) U.S. Cl. ............ 423/418.2; 252/373; 423/651; 423/652; 423/653; 423/654

(58) Field of Classification Search .......... 252/373; 423/418.2, 651, 652, 653, 654
See application file for complete search history.

(56) References Cited

U.S. PATENT DOCUMENTS

| | | | |
|---|---|---|---|
| 4,392,869 A * | 7/1983 | Marion et al. | ............ 48/197 R |
| 4,959,494 A | 9/1990 | Felthouse | |
| 5,015,461 A | 5/1991 | Jacobson et al. | |
| 5,149,464 A | 9/1992 | Green et al. | |
| 5,500,149 A | 3/1996 | Green et al. | |
| 6,238,816 B1 | 5/2001 | Cable et al. | |
| 6,409,940 B1 | 6/2002 | Gaffeny et al. | |
| 6,447,745 B1 * | 9/2002 | Feeley et al. | ............ 423/648.1 |

OTHER PUBLICATIONS

Liu, "Activity and Structure of Perovskites as Diesel-Reforming Catalysts for Solid Oxide Fuel Cell," Int. J. Appl. Ceram. Technol., vol. 4 (2), (2005).
Erri, "Novel Perovskite-based catalysts for autothermal JP-8 fuel reforming," Chemical Engineering Science, 61 (2006).
Ashcroft, "An in situ, energy-dispersive x-ray diffraction study of natural gas conversion by carbon dioxide reforming," Journal of Physical Chemistry 97 (1993).
Gaura et al., "Rh, Ni, and Ca substituted pyrochlore catalysts for dry reforming of methane," Applied Catalysis A: General 403 (2011).

* cited by examiner

*Primary Examiner* — Wayne Langel
(74) *Attorney, Agent, or Firm* — James B. Potts; Mark P. Dvorscak; John T. Lucas (57) ABSTRACT

A method of catalytically reforming a reactant gas mixture using a pyrochlore catalyst material comprised of one or more pyrochlores having the composition $A_{2-w-x}A'_wA''_xB_{2-y-z}B'_yB''_zO_{7-\Delta}$. Distribution of catalytically active metals throughout the structure at the B site creates an active and well dispersed metal locked into place in the crystal structure. This greatly reduces the metal sintering that typically occurs on supported catalysts used in reforming reactions, and reduces deactivation by sulfur and carbon. Further, oxygen mobility may also be enhanced by elemental exchange of promoters at sites in the pyrochlore. The pyrochlore catalyst material may be utilized in catalytic reforming reactions for the conversion of hydrocarbon fuels into synthesis gas ($H_2$+CO) for fuel cells, among other uses.

23 Claims, 3 Drawing Sheets

PYROCHLORE-TYPE CATALYSTS FOR THE REFORMING OF HYDROCARBON FUELS

RELATION TO OTHER APPLICATIONS

This patent application claims priority to U.S. Provisional Patent Application No. 61/044,537 filed Apr. 14, 2008, submitted by Berry, et al., which is hereby incorporated by reference in its entirety.

STATEMENT OF GOVERNMENTAL SUPPORT

The United States Government has rights in this invention pursuant to the employer-employee relationship of the Government to the inventors as U.S. Department of Energy employees and site-support contractors at the National Energy Technology Laboratory.

TECHNICAL FIELD

A method of catalytically reforming a reactant gas mixture using a pyrochlore catalyst material comprised of one or more pyrochlores having the composition $A_{2-w-x}A'_wA''_xB_{2-y-z}B'_yB''_zO_{7-\Delta}$. Distribution of catalytically active metals throughout the structure at the B site creates an active and well dispersed metal locked into place in the crystal structure. This greatly reduces the metal sintering that typically occurs on supported catalysts used in reforming reactions, and reduces deactivation by sulfur and carbon. Further, oxygen mobility may also be enhanced by elemental exchange of promoters at sites in the pyrochlore. The pyrochlore catalyst material may be utilized in catalytic reforming reactions for the conversion of hydrocarbon fuels into synthesis gas ($H_2$+CO) for fuel cells, among other uses.

BACKGROUND OF THE INVENTION

The combustion of fossil fuels (i.e. coal, petroleum and natural gas) is the primary source of power production in transportation and stationary power applications. However, combustion is relatively inefficient compared to advanced processes, due to significant heat and frictional losses during the conversion process. Furthermore, the products of combustion, including $NO_x$, $SO_x$, particulate matter, CO, and $CO_2$, are the subject of current and anticipated regulations. There is therefore an interest in energy conversion technologies that utilize fossil fuel resources more efficiently with less of an environmental impact.

For example, one effective means of using fossil fuels as an energy source is to catalytically reform them into synthesis gas ($H_2$+CO), which can then be converted to electrical power in a solid oxide fuel cell (SOFC). Of the available alternative technologies, no other energy production method offers the combination of clean energy and efficiency provided by a SOFC. Because a wide range of fuels can be used, SOFCs have proven to be versatile, and can be used in such applications as auxiliary power units (APUs) for diesel trucks, as well as decentralized stationary power for commercial and military applications Three main catalytic reforming reactions can be used to convert hydrocarbon fuels into synthesis gas ($H_2$+CO) for fuel cells: steam reforming (SR), catalytic partial oxidation (CPOX), and autothermal reforming (ATR).

| | | |
|---|---|---|
| SR | $C_nH_m + H_2O \rightarrow H_2 + CO$ | $\Delta H > 0$ |
| CPOX | $C_nH_m + O_2 \rightarrow H_2 + CO$ | $\Delta H < 0$ |
| ATR | $C_nH_m + H_2O + O_2 \rightarrow H_2 + CO$ | $\Delta H \sim 0$ |

The choice of reforming reaction depends on the application. For fuel cell applications listed where fast light-off, kinetics, quick dynamic response and compactness are of most benefit, CPOX is generally favored. For applications that favor efficiency, SR is generally favored due to its ability to utilize system heat in the reformer. In other applications, ATR or some other degree of oxidative steam reforming (OSR) is desired because of the ability to control the reformate gas composition and minimize heat transfer limitations.

A wide variety of hydrocarbons can be reformed to produce synthesis gas, including natural gas, coal, gasoline and diesel. Of these fuels, diesel is an attractive and practical choice in many cases, because of its high hydrogen density and well developed distribution infrastructure. Again, the choice is application dependent. However, it is also the most difficult fuel to reform because diesel fuel is a mixture of a wide variety of paraffin, naphthene, aromatic and organosulfur compounds, each of which reacts differently in a CPOX reaction sequence. The specific nature of each of these components, i.e. chain length of n-paraffins, substituents attached to hydrocarbon rings, and degree of saturation of aromatic compounds affects the overall fuel conversion. Some of these constituents are also known to deactivate reforming catalysts through carbon formation and sulfur poisoning.

Thus, the challenge in reforming diesel is to develop a catalyst that can maintain high product selectivity to $H_2$ and CO in the presence of aromatics and sulfur species, while being robust enough to operate at reforming conditions, typically 800-1000° C.

Reforming catalysts have typically been nickel or Group-VIII noble metals supported by various high surface area oxide substrates such as aluminas, silicas, and mixed metal oxides. In some cases, pyrochlores are included as suitable supports for the catalytically active metals. See e.g. U.S. Pat. No. 6,238,816, issued to Cable et al, issued May 29, 2001; U.S. Pat. No. 6,409,940, issued to Gaffney et al, issued Jun. 25, 2002. The metal is dispersed onto the support surface in small crystallites to maximize the amount of active metal exposed. However, this design of the catalyst may be predisposed to carbon formation and deactivation by sulfur. The adsorption of sulfur and carbon has been shown to be structure sensitive. Specifically, both carbon and sulfur adsorption have been linked to the metal cluster size, with larger clusters more prone to deactivation. See Barbier et al, "Effect of presulfurization on the formation of coke on supported metal catalysts," *Journal of Catalysis*, 102 (1986), among others.

Oxide-based catalysts such as perovskites ($ABO_3$) have been examined as alternatives to noble metal catalysts for at least the autothermal reforming of a JP-8 fuel surrogate and dry ($CO_2$) reforming of methane by substituting various metals into the A and B sites. See Liu and Krumpelt, "Activity and Structure of Perovskites as Diesel-Reforming Catalysts for Solid Oxide Fuel Cell," *Int. J. Appl. Ceram. Technol.*, Vol 4 (2), (2005), and see Erri et al, "Novel Perovskite-based catalysts for autothermal JP-8 fuel reforming," *Chemical Engineering Science*, 61 (2006), among others. Although the perovskite catalysts did exhibit generally favorable activity and coking resistance in the dry reforming case, analyses following catalytic tests showed that the perovskite structure is not maintained and separation of the active metals from the structure is observed. Findings indicate that the structural changes observed in the catalyst occurred primarily during the initial reduction stage. No indication was given regarding long-term stability of that catalyst system.

In another class of oxide-based catalysts, it has been observed that bulk ruthenate pyrochlores ($Ln_2Ru_2O_7$: Ln is a lanthanide) are highly active for both dry reforming and CPOX of methane. See, Ashcroft et al., "An in situ, energy-dispersive x-ray diffraction study of natural gas conversion by carbon dioxide reforming," *Journal of Physical Chemistry* 97 (1993), among others. However, despite high activity, post-run characterization of this particular catalyst revealed that the bulk $Pr_2Ru_2O_7$ pyrochlore was not stable under CPOX conditions. Catalytic activity of the material was likely derived from the decomposition of the pyrochlore phase under the reducing reaction conditions, which created a Ru-metal enriched surface and a defect fluorite structure in the bulk due to the increased Pr—Ru ratio in the bulk. Decomposition was also observed on the ruthenate catalysts used for the dry reforming of methane. The structural instability of this particular material is not desirable for reforming reactions like CPOX, and likely occurred as a result of selecting a metal (Ru) to occupy entire B-site that is highly reducible. During the break down of the pyrochlore or oxide-based catalyst structure, Ru or active metal migration to the surface leads to the formation of an essentially supported metal catalyst, which should be avoided due to the increased tendency towards deactivation by carbon and sulfur. There is also a tendency toward further metal migration or vaporization, leading to long-term permanent catalytic activity loss.

Similarly, other $A_2B_2O_7$ pyrochlores have been disclosed for use as catalysts in the reforming of hydrocarbons. These catalysts are limited to $A_2B_2O_7$ structures and emphasize the catalytic nature of binary mixed metal oxides. Use of additional dopants at the A and B sites in order to enhance the catalytic nature of the crystal structure are not disclosed. Further, in some cases, the catalytic activity of these binary mixed oxides stems largely from B-site migration and the metal-enriched surface which results. See e.g., U.S. Pat. No. 5,500,149, issued to Green et al, issued on Mar. 19, 1996; U.S. Pat. No. 5,149,464, issued to Green et al, issued on Sep. 22, 1992; U.S. Pat. No. 5,015,461, issued to Jacobson et al, issued on May 14, 1991; U.S. Pat. No. 4,959,494, issued to Felthouse, issued on Sep. 25, 1990.

However, many pyrochlores display chemical and thermal stability with high melting points and show the mechanical strength necessary to accommodate metal substitutions necessary for high catalytic activity. The development of a pyrochlore catalyst with spatially distributed active metal components in a structure that resists decomposition at high reforming temperatures would provide a more durable and effective catalyst compared to simple supported metal clusters. Resistance to decomposition would maintain the spatially distributed active metal components as structural components in the pyrochlore, and significantly minimize the migration of active metal components to the surface. This could largely avoid the undesirable defacto formation of a supported metal catalyst from some initially oxide-based catalyst systems at the reforming conditions, and could greatly reduce the tendency towards deactivation by carbon and sulfur. It would also hold potential as a long-life reforming catalyst.

Accordingly, it is an object of this disclosure to provide a method of catalytically reforming a reactant gas mixture using a pyrochlore catalyst material stable under reaction conditions.

It is a further object of this disclosure to catalytically reform a reactant gas mixture using a pyrochlore catalyst material which maintains high product selectivity to $H_2$ and CO in the presence of aromatics and sulfur species.

It is a further object of this disclosure to catalytically reform a reactant gas mixture using a pyrochlore catalyst material that resists both sulfur poisoning and carbon deposition.

It is a further object of this disclosure to catalytically reform a reactant gas mixture using a pyrochlore catalyst material that minimizes catalytically active metal migration to the surface, leading to the formation of a supported metal catalyst.

It is a further object of this disclosure to catalytically reform a reactant gas mixture using a pyrochlore catalyst material where substitution of elements in A sites and/or B sites creates defects in the crystal structure and improves the lattice oxygen mobility.

These and other objects, aspects, and advantages of the present disclosure will become better understood with reference to the accompanying description and claims.

SUMMARY OF INVENTION

Provided herein is a method for catalytically reforming a reactant gas mixture using a pyrochlore catalyst material comprised of one or more pyrochlores having the composition $A_{2-w-x}A'_wA''_xB_{2-y-z}B'_yB''_zO_{7-\Delta}$. wherein:

A is a trivalent ion of an element selected from the group consisting of La, Ce, Pr, Nd, Pm, Sm, Eu, Gd, Tb, Dy, Er, Tm, Yb, Lu, Bi, Sc, Y, In, and Tl, A' is a trivalent ion of an element not equivalent to A and selected from the group consisting of La, Ce, Pr, Nd, Pm, Sm, Eu, Gd, Tb, Dy, Er, Tm, Yb, Lu, Bi, Sc, Y, In, and Tl, and wherein $0 \leq w \leq 1$, A" is a divalent ion selected from the group consisting of Mg, Ca, Sr, and Ba, and wherein $0 \leq x < 1$ and $w+x \leq 1$, B is a tetravalent ion of an element selected from the group consisting of Ti, Cr, Mn, Zr, Mo, Tc, Rh, Pd, Hf, Os, Ir, Pt, Si, Ge, Sn, and Pb, B' is a trivalent ion or a tetravalent ion of an element selected from the group consisting of Mo, Fe, Os, Ru, Co, Rh, Ir, Ni, Pd, Pt, Cu, Re and V, wherein if B' is a tetravalent ion then B' is an element not equivalent to B, and wherein $0 < y \leq 1$, B" is a divalent ion, a trivalent ion, or a tetravalent ion of an element selected from the group consisting of Mg, Ca, Sr, Ba, Y, Ce, Re, Cr, Ti, Zr, Hf, Ni, Co, V, and Mo, wherein if B" is a trivalent ion B" is an element not equivalent to B', and if B" is a tetravalent ion than B" is an element not equivalent to B' and not equivalent to B, wherein $0 \leq z < 1$ and $y+z \leq 1$, and where $\Delta$ is a number that renders the composition charge neutral, where an average ionic radius ratio of ions in A, A' and A"-site holding 8-fold coordination with oxygen to ions in B, B' and B"-site holding 6-fold coordination with oxygen is between 1.46 and 1.80.

The distribution of catalytically active metals throughout the structure of a pyrochlore creates an active and well dispersed metal bound in the crystal structure, reducing the metal sintering that typically occurs on supported catalysts used in reforming reactions. It is believed that smaller metallic sites are less susceptible to poisoning by sulfur or carbon than larger ones, thus, distributing the metal throughout the structure may decrease catalyst deactivation by sulfur and carbon. Further, oxygen mobility may also be enhanced by the exchange of various elements at A and B sites in the pyrochlore.

Exemplary pyrochlore material catalyst preparation and use in reforming are demonstrated herein. The pyrochlore material catalysts exhibit stable performance under the reaction conditions utilized for catalytic partial oxidation (CPOX), steam reforming (SR), dry reforming (DR), and oxidative steam reforming (OSR).

The various features of novelty which characterize this disclosure are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the disclosure is illustrated.

DETAILED DESCRIPTION OF A PREFERRED EMBODIMENT

The following description is provided to enable any person skilled in the art to use the invention and sets forth the best mode contemplated by the inventors for carrying out the invention. Various modifications, however, will remain readily apparent to those skilled in the art, since the principles of the present invention are defined herein specifically to provide a method of catalytically reforming a reactant gas mixture using a pyrochlore catalyst material with catalytically active metals substituted within the structure of the pyrochlore, to produce a gaseous mixture comprised of at least hydrogen and carbon monoxide using a thermally stable catalyst having resistance to both sulfur poisoning and carbon deposition.

As used herein, the term "pyrochlore material catalyst" means a catalyst material comprised of one or more pyrochlores having the composition $A_{2-w-x}A'_{w}A''_{x}B_{2-y-z}B'_{y}B''_{z}O_{7-\Delta}$, where the pyrochlore material catalyst may also be comprised of one or more of an other crystal phase including simple oxide, perovskite, fluorite, weberite, and others, and wherein the pyrochlore material catalyst may be either self-supported or structurally supported on a substrate such as aluminas, silicas, mixed metal oxides, and other substrates known in the art, and combinations thereof.

The improved performance of the pyrochlore material catalyst disclosed herein results from the distribution of catalytically active metals throughout the structure of a pyrochlore, creating an active, stable, and well dispersed metal incorporated within the crystal structure itself. This greatly reduces the metal sintering that typically occurs on supported catalysts used in reforming reactions, and reduces deactivation by sulfur and carbon. Generally speaking, and without being bound by theory, it is believed that smaller metallic sites are less susceptible to poisoning by sulfur or carbon than larger ones. Further, oxygen mobility may also be enhanced by elemental exchange of various elements at the A and B sites in the pyrochlore. Oxygen mobility is also an identified mechanism for the reduction of carbon accumulation on the surface in reforming reactions.

Figure 1:
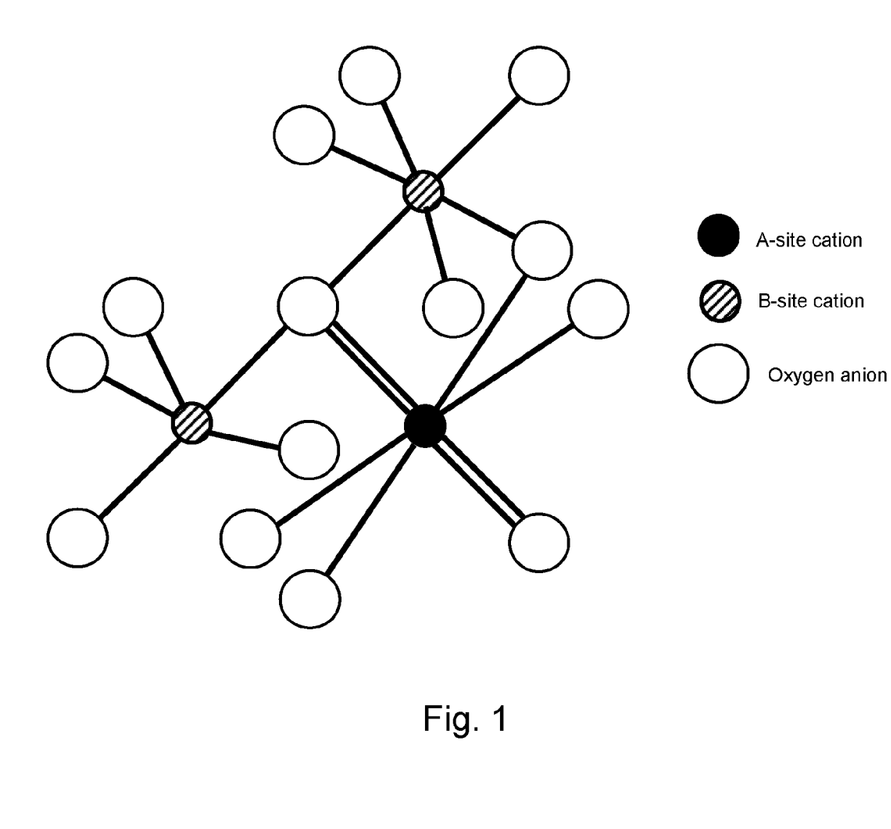
FIG. 1 illustrates an exemplary pyrochlore structure.

A pyrochlore is composed of ½ trivalent cations and ½ tetravalent cations in a cubic cell structure, with the general stoichiometry $A_2B_2O_7$. The A-site is usually a large cation (typically rare earth elements) and is coordinated with eight oxygen atoms. The B-site cation has a smaller radius (usually transition metal) and is coordinated with six oxygen atoms. In order to form a stable pyrochlore, A and B cations must have an ionic radius ratio $r_A/r_B$ between 1.46 and 1.80. When more than one A and/or B metal cations are present in the pyrochlore, these radii are calculated as the average weighted radii by the relative amounts of each species present therein. A typical pyrochlore structure is shown at FIG. 1. See also Subramanian et al, "Oxide Pyrochlores—A Review," *Progress in Solid State Chemistry*, 15 (1983).

Applicants have found that substituting for A and B cations alters the catalytic activity and resistance to deactivation in reforming reactions. A wide range of elements can be substituted into the pyrochlore lattice while maintaining the distinctive pyrochlore structure. With the proper selection, substitution of cations into the A-site results in improved oxygen-ion conductivity and promotes carbon oxidation in the material at elevated temperatures, which limits carbon accumulation during the reforming reaction. Meanwhile, substitution of the B-site cations with an active reforming metal can be used to improve the catalytic activity of the material. Metal substituted into the B-site retain high activity and selectivity after substitution into the pyrochlore while elements substituted at the A-site promote and further improve the activity, which significantly reduces carbonaceous deposits on the pyrochlore catalyst.

Generally speaking and without being bound by theory, $H_2$ and CO yields for the pyrochlore material catalysts do not decrease continuously in the presence of aromatic and organic sulfur compounds, but rather slightly drop to lower, but stable, levels. This is evidence of kinetic inhibition of the active catalytic sites by the contaminants rather than catalyst deactivation. In addition, olefins—a product of non-catalytic reforming—remain low after aromatic and organic sulfur contaminant species are added to the reactant gas mixture, indicating that the B-site dopants in the pyrochlore structure help retain catalytic activity in the presence of the contaminants. Further, after the contaminants are removed, olefin yields return to essentially zero concentration and the $H_2$ and CO yields produced recover. Collectively, these results could be explained by a rapid (but limited) deposition of surface species derived from or caused by the aromatic and organic sulfur compounds, which limits the approach to equilibrium $H_2$ and CO yields on the pyrochlore while not continuously accumulating on the surface of the doped pyrochlore.

Thus, provided herein is a method of catalytically reforming a reactant gas mixture, comprising providing a reactant gas mixture comprised of hydrocarbons and an oxidant, and providing a pyrochlore material catalyst comprised of one or more pyrochlores having the composition $A_{2-w-x}A'_{w}A''_{x}B_{2-y-z}B'_{y}B''_{z}O_{7-\Delta}$ where:

A is a trivalent ion of an element selected from the group consisting of La, Ce, Pr, Nd, Pm, Sm, Eu, Gd, Tb, Dy, Er, Tm, Yb, Lu, Bi, Sc, Y, In, and Tl, A' is a trivalent ion of an element not equivalent to A and selected from the group consisting of La, Ce, Pr, Nd, Pm, Sm, Eu, Gd, Tb, Dy, Er, Tm, Yb, Lu, Bi, Sc, Y, In, and Tl, and wherein $0 \leq w \leq 1$, A" is a divalent ion selected from the group consisting of Mg, Ca, Sr, and Ba, and wherein $0 \leq x < 1$ and $w+x \leq 1$, B is a tetravalent ion of an element selected from the group consisting of Ti, Cr, Mn, Zr, Mo, Tc, Rh, Pd, Hf, Os, Ir, Pt, Si, Ge, Sn, and Pb, B' is a trivalent ion or a tetravalent ion of an element selected from the group consisting of Mo, Fe, Os, Ru, Co, Rh, Ir, Ni, Pd, Pt, Cu, Re and V, wherein if B' is a tetravalent ion then B' is an element not equivalent to B, and wherein $0 < y \leq 1$, B" is a divalent ion, a trivalent ion, or a tetravalent ion of an element selected from the group consisting of Mg, Ca, Sr, Ba, Y, Ce, Re, Cr, Ti, Zr, Hf, Ni, Co, V, and Mo, wherein if B" is a trivalent ion B" is an element not equivalent to B', and if B" is a tetravalent ion than B" is an element not equivalent to B' and not equivalent to B, wherein $0 \leq z < 1$ and $y+z \leq 1$, and where $\Delta$ is a number that renders the composition charge neutral, where the average ionic radius ratio of ions in A, A' and A"-site holding 8-fold coordination with oxygen to ions in B, B' and B"-site holding 6-fold coordination with oxygen is between 1.46 and 1.80. The reactant gas mixture is contacted with the pyrochlore material catalyst at conditions of temperature, pressure and gas flow rate during the contacting to promote a catalytic reforming process and produce a gaseous mixture comprised of at least hydrogen and carbon monoxide.

Any suitable reaction regime may be applied in order to contact the reactant gas mixture with the pyrochlore material catalyst. One suitable regime is a fixed bed reaction regime, in which the catalyst is retained within a reaction zone in a fixed arrangement. Particles of the pyrochlore catalyst material may be employed in the fixed bed regime, retained using fixed bed reaction techniques well known in the art. Alternatively, the catalyst may be in the form of a pellet, foam, honeycomb, monolith, or other geometry advantageous in facilitating contact. The pyrochlore material catalyst may be supported on a substrate such as aluminas, silicas, and mixed metal oxides, and other substrates known in the art.

The reactant gas mixture is contacted with the pyrochlore material catalysts in a reaction zone maintained at conversion-promoting conditions effective to produce an effluent stream comprising carbon monoxide and hydrogen. The reactant gas mixture may be comprised of one or more of natural gas; methane, liquefied petroleum gas comprised of C2-C5 hydrocarbons; diesel, jet fuels, gasoline, JP fuels, tars, and kerosene comprised of C6+ heavy hydrocarbons; oxygenated hydrocarbons such as biodiesel, alcohols, and dimethyl ether, and methane. The reactant gas mixture may be comprised of diesel having a sulfur content greater than 14 parts per million by weight. The reactant gas mixture may be comprised of diesel and aromatics, where the aromatic content is greater than 20 weight percent, with greater than 35 weight percent of the aromatic content being multi-ring aromatics. It is understood that the foregoing examples constitute exemplary hydrocarbon sources only and are not meant to limit the disclosure herein.

The ratio of oxygen to carbon in the reactant gas mixture may vary, with the mixture dependent on the particular hydrocarbons chosen and the amount of oxygen necessary to conduct the particular partial oxidation reaction, as is known in the art. Preferably, the reactant gas mixture has an overall oxygen to carbon atomic ratio equal to or greater than 0.9.

The catalytic reforming process may be catalytic partial oxidation using one or more of air or oxygen as an oxidant. The catalytic reforming process may also be steam reforming using steam as an oxidant. The catalytic reforming process may also be oxidative steam reforming oxidant using one or more of air, oxygen, or steam as an oxidant. The catalytic reforming process may also be $CO_2$ reforming using carbon dioxide as an oxidant or any combination of oxidant thereof.

EXAMPLES

Catalyst Preparation

Catalysts may be prepared using the Pechini Method. See U.S. Pat. No. 3,330,697, issued to Pechini, issued on Jul. 11, 1967. Sources of the metal cations A, A', A", B, B', or B" include compounds of those cations and mixtures thereof. An exemplary preparation method follows:

Metal nitrate precursors and citric acid are dissolved separately into deionized water. The citric acid/metal molar ratio may be from 1.0-1.5, preferably about 1.2. Aqueous metal salts are then combined into a beaker and stirred. To this mixture, aqueous citric acid is added. The solution is then heated to 65° C. under stirring. At 65° C., ethylene glycol is added. The ethylene glycol/citric acid ratio may be from 1.0-4.0, preferably about 1.0. The solution is then stirred continuously at temperature until most of the water has evaporated and a viscous, transparent resin remains. The beaker is then transferred into a heating mantle pre-heated to 65° C. The temperature of the mantle is increased to 130° C. to promote a polyesterfication reaction between the citric acid and the ethylene glycol. The formed catalyst intermediate is then placed into an oven to dry. Following drying, the organic precursor is calcined at 1000° C. Ramp rate for the calcination step is 5° C./min.

An alternate preparation method is co-precipitation: Metal salt precursors are dissolved into de-ionized water to form a 1M solution. The metal solution is then added dropwise into a solution containing excess ammonium carbonate (1M). Next, the formed precipitate is aged for 6 hours at 60° C., vacuum filtered to separate precipitate, then rinsed and dried. Precursor is then calcined at 1000° C. for 8 hours using a ramp rate for calcination of 5° C./min.

It will be apparent to those skilled in the art that the foregoing preparation methods are presented by way of example only. Various alterations, improvements, and modifications to the presented preparation methods are within the scope and spirit of the present disclosure.

Catalyst Testing:

Catalysts synthesized by the exemplary methods were tested for catalytic partial oxidation (CPOX), steam reforming (SR), dry reforming (DR), and oxidative steam reforming (OSR) of a surrogate logistic fuel mixture, biodiesel, and commercial Diesel Fuel-2 (DF-2). The catalyst testing took place in a fixed-bed continuous-flow reactor, shown in FIG. 2. Mass flow controllers 201 and 202 were used to deliver $N_2$ and air/$CO_2$ to the system, while the hydrocarbon fuel and water were fed to the reactor by syringe pumps 203 and 204. The feed components passed through pre-heating coils 205 through 208 as illustrated prior to the reactor inlet to ensure complete vaporization of the fuel and thorough heating of the gases. $N_2$ was used as a carrier gas to transport the vaporized hydrocarbon to the reactor tube inlet, where the fuel/$N_2$ and oxidant combined before they entered the catalytic reactor 209. A hot box 210 heated by convection heater 211 surrounded the catalytic reactor 209 to vaporize the fuel and maintain uniform inlet and product gas temperatures. The hot box temperature was set to 375° C. and controlled by a programmable temperature controller. Fixed bed 212 containing the catalyst was positioned in the center of an 8 mm i.d. tubular catalytic reactor section and diluted with quartz sand (up to 3 ml) of the same particle size as the catalyst to minimize temperature gradients and channeling throughout the bed. Heat was supplied via a split tube furnace 213 encapsulating catalytic reactor 209. Bed temperature was measured by an axially centered thermocouple 214 and was controlled by a programmable controller. Reactor pressure was maintained by back pressure regulator 215 and pressure gauge 218 provided pressure indications.

Figure 2:
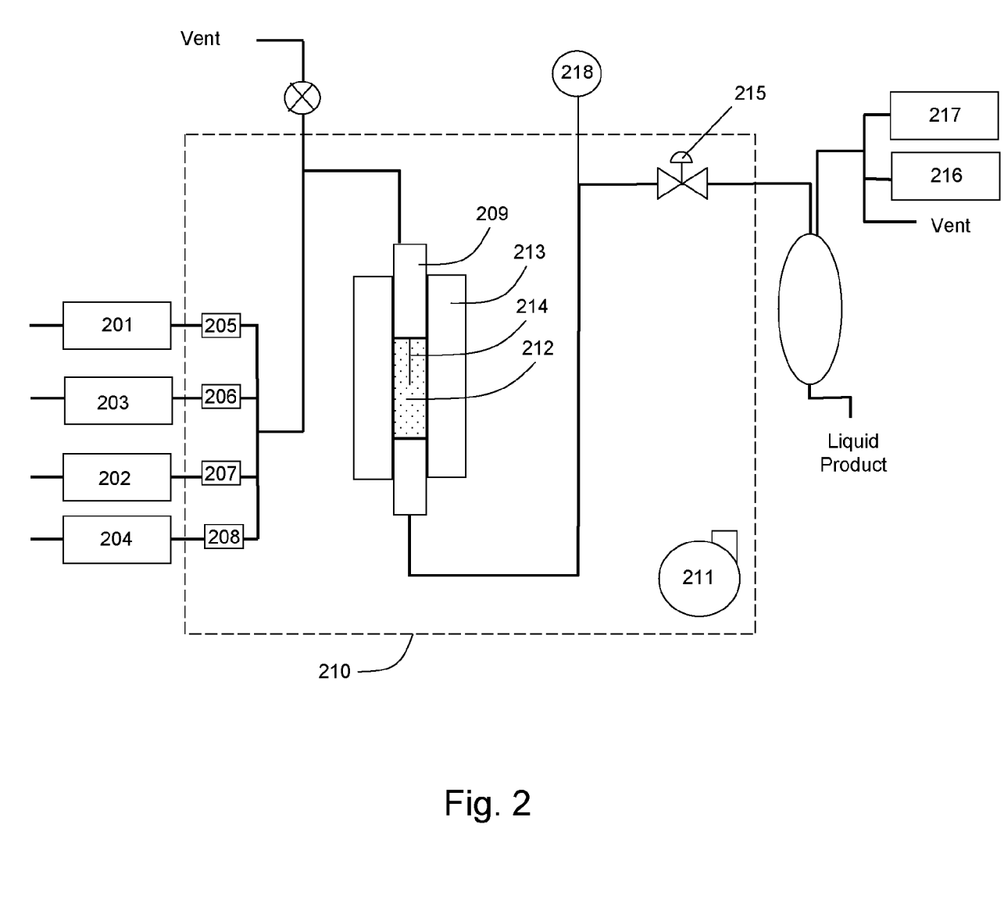
FIG. 2 illustrates an exemplary set-up for reforming reactions using the pyrochlore material catalyst.

Post-reactor, water was condensed out of the gas stream. Compositions of $H_2$, CO, $CO_2$, and $CH_4$ in the dry gas were analyzed by a mass spectrometer 216. Larger hydrocarbon products ($C_2$-$C_6$) were measured by a gas chromatograph 217. Carbon balances for all experiments were 100±10%.

The surrogate fuel mixture used in this testing was a combination of model compounds chosen to represent common diesel fuel components. n-Tetradecane (TD), 1-methylnaphthalene (MN), and dibenzothiophene (DBT) were the model compounds used in some of these studies, representing paraffin, aromatic, and sulfur compounds respectively.

Experimental conditions for catalytic partial oxidation (CPOX), steam reforming (SR), dry reforming (DR), and oxidative steam reforming (OSR) were as listed in Table 1.

TABLE 1

Reaction conditions for reforming experiments

| Reactor Conditions | CPOX | SR | DR | OSR |
|---|---|---|---|---|
| O/C ratio | 1.2; 1.3 | — | 3.0[a] | 1.0 |
| S/C ratio | — | 3.0 | — | 0.5 |
| Gas Flow (sccm) | 400 | 400 | 400 | 400 |
| WHSV (scc/$g_{catalyst}$/h) | 25,000 & 50,000 | 25,000 | 25,000 | 25,000 |

TABLE 1-continued

Reaction conditions for reforming experiments

| Reactor Conditions | CPOX | SR | DR | OSR |
|---|---|---|---|---|
| Pre-heat Temperature (° C.) | 375 | 375 | 375 | 375 |
| Bed Temperature (° C.) | 900 | 900 | 900 | 900 |
| Pressure (MPa) | 0.23 | 0.23 | 0.23 | 0.23 |
| Catalyst Bed (mg) | 480; 960 | 960 | 960 | 960 |

[a]carbon in O/C does not include carbon from $CO_2$

Catalysis Testing Results—CPOX:

CPOX results from catalysts prepared by the exemplary methods are presented below in Tables 2 and 3. $H_2$, CO, $CO_2$ and $CH_4$ values in Table 2 are instantaneous values taken after 2 hours time on stream during the CPOX of a surrogate diesel fuel mixture and are presented as % dry gas volume. $H_2$, CO, $CO_2$ and $CH_4$ values in Table 3 are instantaneous values taken after their respective listed times on stream (TOS) during the CPOX of a surrogate diesel fuel mixture, diesel fuel-2 or biodiesel and are presented as % dry gas volume. Results are presented with respect to the pyrochlore comprising the pyrochlore material catalyst. During extended runs listed in Table 3, the pyrochlore material catalysts exhibited stable performance under reaction conditions stated under CPOX in Table 1, in terms of $H_2$ and CO produced, for at least 9 hours on stream and up to 60 hours with minimal sign of deactivation (i.e. 5% loss from initial $H_2$ and CO product compositions). The amount of olefins formed is also a measure of activity loss. Their presence indicates gas-phase (non-catalytic) chemistry occurring in the reactor. Olefin yields remain low for some of the catalysts during the extended runs listed in Table 3, further indicating the potential stability of the respective pyrochlore material catalyst under these conditions.

TABLE 2

Catalyst formulations and corresponding instantaneous product composition (dry gas basis) taken after 2 h time on stream (TOS) during the CPOX of 5 wt % MN + 50 ppmw DBT/TD at O/C = 1.2.

| Catalyst | % $H_2$ | % CO | % $CO_2$ | % $CH_4$ | % Olefins |
|---|---|---|---|---|---|
| $La_{1.5}Sr_{0.5}Zr_{1.73}Ni_{0.28}O_{7-\Delta}$ | 14.07 | 14.84 | 4.98 | 1.97 | 1.04 |
| $La_{1.5}Sr_{0.5}Zr_{1.95}Pt_{0.05}O_{7-\Delta}$ | 16.47 | 16.87 | 3.79 | 1.58 | 0.30 |
| $La_{1.5}Sr_{0.5}Zr_{1.95}Rh_{0.05}O_{7-\Delta}$ | 18.48 | 18.50 | 2.84 | 1.21 | 0.04 |
| $La_{1.5}Sr_{0.5}Zr_{1.95}Ru_{0.05}O_{7-\Delta}$ | 17.71 | 17.85 | 3.29 | 1.26 | 0.20 |
| $La_{1.97}Mg_{0.03}Zr_{1.95}Rh_{0.05}O_{7-\Delta}$ | 17.62 | 17.86 | 2.97 | 1.40 | 0.10 |
| $La_{1.9}Ca_{0.1}Zr_{1.95}Rh_{0.05}O_{7-\Delta}$ | 18.91 | 18.83 | 2.51 | 1.08 | 0.01 |
| $La_{1.97}Sr_{0.03}Zr_{1.95}Rh_{0.05}O_{7-\Delta}$ | 18.28 | 18.54 | 2.71 | 1.26 | 0.04 |
| $La_{1.99}Ba_{0.01}Zr_{1.95}Rh_{0.05}O_{7-\Delta}$ | 18.37 | 18.90 | 2.53 | 1.33 | 0.02 |
| $La_{1.5}Ce_{0.5}Zr_{1.95}Rh_{0.05}O_{7-\Delta}$ | 16.89 | 16.90 | 3.64 | 1.63 | 0.30 |
| $La_{1.5}Gd_{0.5}Zr_{1.95}Rh_{0.05}O_{7-\Delta}$ | 17.05 | 16.60 | 3.78 | 1.43 | 0.38 |
| $La_{1.5}Sm_{0.5}Zr_{1.95}Rh_{0.05}O_{7-\Delta}$ | 15.22 | 15.37 | 4.44 | 1.72 | 0.79 |
| $La_{1.5}Y_{0.5}Zr_{1.95}Rh_{0.05}O_{7-\Delta}$ | 17.29 | 17.90 | 3.14 | 1.42 | 0.13 |
| $La_{1.5}Y_{0.5}Zr_{1.95}Ru_{0.05}O_{7-\Delta}$ | 18.48 | 18.21 | 3.41 | 1.07 | 0.08 |
| $La_{1.67}Ce_{0.25}Ca_{0.08}Zr_{1.94}Rh_{0.06}O_{7-\Delta}$ | 18.49 | 18.77 | 2.47 | 1.15 | 0.01 |
| $La_{1.67}Ce_{0.25}Ca_{0.08}Zr_{1.94}Ru_{0.06}O_{7-\Delta}$ | 17.48 | 17.80 | 3.01 | 1.44 | 0.16 |
| $La_{1.67}Gd_{0.25}Ca_{0.08}Zr_{1.94}Rh_{0.06}O_{7-\Delta}$ | 18.36 | 18.48 | 2.66 | 1.16 | 0.04 |
| $La_{1.67}Gd_{0.25}Ca_{0.08}Zr_{1.94}Ru_{0.06}O_{7-\Delta}$ | 17.76 | 17.97 | 2.95 | 1.39 | 0.13 |
| $La_{1.64}Y_{0.25}Ca_{0.11}Zr_{1.94}Rh_{0.06}O_{7-\Delta}$ | 18.30 | 18.45 | 2.62 | 1.29 | 0.04 |
| $La_{1.64}Y_{0.25}Ca_{0.11}Zr_{1.94}Ru_{0.06}O_{7-\Delta}$ | 16.99 | 17.54 | 3.32 | 1.56 | 0.23 |

TABLE 3

Catalyst formulations, O/C ratio, fuel, TOS, and corresponding instantaneous product composition (dry gas basis) taken after listed TOS during the CPOX studies.

| Catalyst | O/C Ratio | Fuel | TOS (h) | % $H_2$ | % CO | % $CO_2$ | % $CH_4$ | % Olefins |
|---|---|---|---|---|---|---|---|---|
| $La_{1.9}Ca_{0.1}Zr_{1.95}Rh_{0.05}O_{7-\Delta}$ | 1.2 | 5 wt % MN + 50 ppmw DBT/TD | 13 | 17.86 | 18.20 | 3.00 | 1.40 | 0.29 |
| $La_{1.5}Y_{0.5}Zr_{1.95}Ru_{0.05}O_{7-\Delta}$ | 1.2 | 5 wt % MN + 50 ppmw DBT/TD | 30 | 16.35 | 15.89 | 4.54 | 1.68 | 0.59 |
| $La_{1.64}Y_{0.25}Ca_{0.11}Zr_{1.94}Rh_{0.06}O_{7-\Delta}$ | 1.2 | 5 wt % MN + 50 ppmw DBT/TD | 58 | 16.57 | 17.05 | 3.71 | 1.55 | 0.48 |
| $La_{1.7}Y_{0.25}Mg_{0.05}Zr_{1.94}Rh_{0.06}O_{7-\Delta}$ | 1.2 | 5 wt % MN + 50 ppmw DBT/TD | 21 | 16.05 | 16.95 | 3.80 | 1.32 | 0.13 |
| $La_{1.7}Y_{0.25}Mg_{0.05}Zr_{1.94}Ru_{0.06}O_{7-\Delta}$ | 1.2 | 5 wt % MN + 50 ppmw DBT/TD | 9 | 16.07 | 16.87 | 3.78 | 1.42 | 0.25 |
| $La_{1.69}Y_{0.25}Sr_{0.06}Zr_{1.94}Rh_{0.06}O_{7-\Delta}$ | 1.2 | 5 wt % MN + 50 ppmw DBT/TD | 48 | 17.52 | 18.02 | 3.14 | 1.46 | 0.13 |
| $La_{1.69}Y_{0.25}Sr_{0.06}Zr_{1.94}Ru_{0.06}O_{7-\Delta}$ | 1.2 | 5 wt % MN + 50 ppmw DBT/TD | 39 | 15.18 | 15.70 | 4.38 | 1.30 | 0.20 |
| $La_{1.72}Y_{0.25}Ba_{0.03}Zr_{1.94}Rh_{0.06}O_{7-\Delta}$ | 1.2 | 5 wt % MN + 50 ppmw DBT/TD | 60 | 15.95 | 16.57 | 4.05 | 1.74 | 0.77 |
| $La_{1.89}Ca_{0.11}Zr_{1.64}Rh_{0.11}Y_{0.25}O_{7-\Delta}$ | 1.2 | 5 wt % MN + 50 ppmw DBT/TD | 44 | 16.91 | 17.98 | 3.18 | 1.95 | 0.44 |
| $La_{1.92}Ca_{0.08}Zr_{1.69}Rh_{0.06}Ce_{0.25}O_{7-\Delta}$ | 1.2 | 5 wt % MN + 50 ppmw DBT/TD | 42 | 16.22 | 16.75 | 3.71 | 2.06 | 0.42 |
| $La_{1.92}Ca_{0.08}Zr_{1.64}Rh_{0.11}Ti_{0.25}O_{7-\Delta}$ | 1.2 | Diesel Fuel-2 | 44 | 18.34 | 20.60 | 2.16 | 0.28 | Not Detected |
| $La_{1.92}Ca_{0.08}Zr_{1.64}Rh_{0.11}Ti_{0.25}O_{7-\Delta}$ | 1.3 | Diesel Fuel-2 | 40 | 16.94 | 19.55 | 2.95 | 0.13 | Not Detected |
| $La_{1.89}Ca_{0.11}Zr_{1.69}Rh_{0.06}Y_{0.25}O_{7-\Delta}$ | 1.2 | Biodiesel | 27 | 19.90 | 22.00 | 2.70 | 0.13 | Not Detected |

Catalysis Testing Results—SR:

The steam reforming of commercial low sulfur diesel fuel-2 was performed using 20 wt % $La_{1.89}Ca_{0.11}Zr_{1.64}Rh_{0.11}Y_{0.25}O_{7-\Delta}$ supported on zirconium doped ceria ($La_{1.89}Ca_{0.11}Zr_{1.64}Rh_{0.11}Y_{0.25}O_{7-\Delta}$/ZDC) are presented below in Table 4. $H_2$, CO, $CO_2$ and $CH_4$ values are averaged over 48 hours time on stream and are presented as % dry gas volume in Table 4. Results are presented with respect to the pyrochlore comprising the pyrochlore material catalyst. Conditions for this testing were as presented under SR at Table 1. Results show that the pyrochlore catalyst produced stable yields under steam reforming conditions with substantially complete conversion of the diesel fuel.

Figure 3:
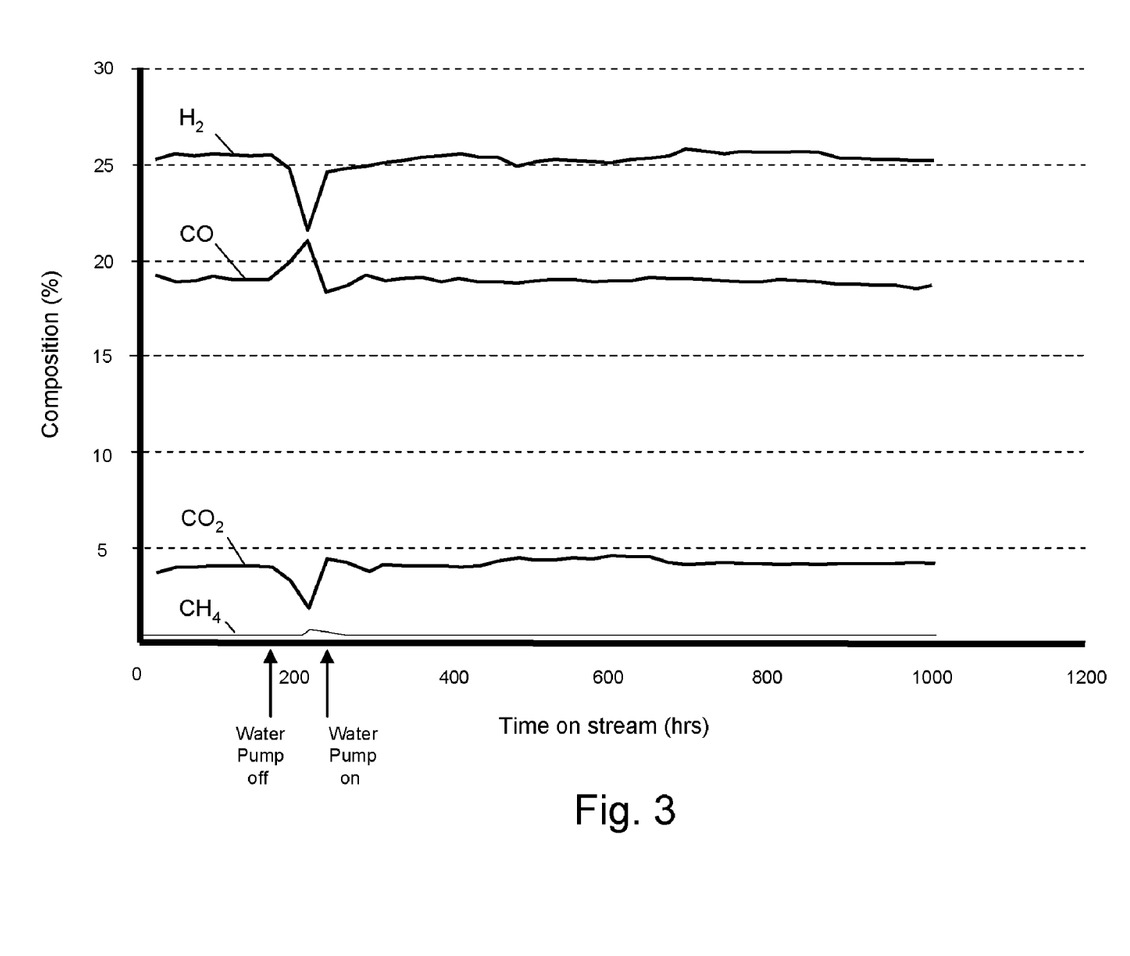
FIG. 3 illustrates exemplary results for oxidative steam reforming conducted over 1000 hours using an embodiment of the pyrochlore material catalyst.

Catalysis Testing Results—OSR:

The oxidative steam reforming of commercial low sulfur diesel fuel-2 was performed using 20 wt % LaCaZrRhY/ZDC. The catalyst demonstrated stable performance continuously for over 1000 hours. Resulting $H_2$, CO, $CO_2$ and $CH_4$ values are presented in Table 5, and instantaneous $H_2$, CO, $CO_2$ and $CH_4$ values over the 1000 hours are shown at FIG. 3, presented as % dry gas volume. Conditions for this testing were as presented under OSR at Table 1. Results show that the pyrochlore catalyst produced stable yields under oxidative steam reforming conditions with substantially complete conversion of the diesel fuel.

TABLE 4

Metal loading, hydrocarbon fuel and product composition (dry gas basis) for SR studies on pyrochlore material catalyst

| Catalyst | Fuel | % $H_2$ | % CO | % $CO_2$ | % $CH_4$ | % Olefins |
|---|---|---|---|---|---|---|
| $La_{1.89}Ca_{0.11}Zr_{1.64}Rh_{0.11}Y_{0.25}O_{7-\Delta}$/ZDC | Diesel Fuel-2 | 50.88 | 14.00 | 8.34 | 0.03 | Not Detected |

TABLE 5

Metal loading, hydrocarbon fuel and product composition
(dry gas basis) for OSR studies on pyrochlore material catalyst

| Catalyst | Fuel | % $H_2$ | % CO | % $CO_2$ | % $CH_4$ | % Olefins |
|---|---|---|---|---|---|---|
| $La_{1.89}Ca_{0.11}Zr_{1.64}Rh_{0.11}Y_{0.25}O_{7-\Delta}$/ZDC | Diesel Fuel-2 | 25.2 | 19.0 | 4.2 | 0.1 | Not Detected |

Catalysis Testing Results—DR:

The dry reforming of commercial low sulfur diesel fuel-2 was performed using 20 wt % $La_{1.89}Ca_{0.11}Zr_{1.64}Rh_{0.11}Y_{0.25}O_{7-\Delta}$/ZDC, and the results are presented below in Table 6. Conditions for this experiment were as presented under DR at Table 1. Results show that the pyrochlore catalyst can produce stable yields under dry reforming conditions with substantially complete conversion of the diesel fuel.

TABLE 6

Catalyst formulation, hydrocarbon fuel and product composition (dry gas basis) for DR studies on pyrochlore material catalyst over 3 hours TOS.

| Catalyst | Fuel | % $H_2$ | % CO | % $CO_2$ | % $CH_4$ | % Olefins |
|---|---|---|---|---|---|---|
| $La_{1.89}Ca_{0.11}Zr_{1.64}Rh_{0.11}Y_{0.25}O_{7-\Delta}$/ZDC | Diesel Fuel-2 | 8.16 | 19.8 | 5.8 | 0.1 | 0.1 |

Thus, presented here is a method of catalytically reforming a reactant gas mixture using a pyrochlore catalyst material that is stable under reaction conditions. The pyrochlore catalyst material utilizes catalytically active metals substituted within the structure of a pyrochlore to produce a thermally stable catalyst that resists both sulfur poisoning and carbon deposition. The pyrochlore catalyst material maintains high product selectivity to $H_2$ and CO in the presence of aromatics and sulfur species. The pyrochlore catalyst material minimizes catalytically active metal migration to the surface, minimizing formation of a supported metal catalyst under reaction conditions. The pyrochlore material catalysts exhibit stable performance under the reaction conditions utilized for catalytic partial oxidation (CPOX), steam reforming (SR), dry reforming (DR), and oxidative steam reforming (OSR).

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of elements or sequences, or the use of numbers, letters, or other designations therefore, is not intended to limit the claimed processes to any order except as may be specified in the claims. Accordingly, the invention is limited only by the following claims and equivalents thereto.

All publications and patent documents cited in this application are incorporated by reference in their entirety for purposes to the same extent as it each individual publication or patent document were so individually denoted.

What is claimed is:

1. A method of catalytically reforming a reactant gas mixture, comprising:
   providing a reactant gas mixture comprising hydrocarbons and an oxidant;
   providing a pyrochlore material catalyst comprised of one or more pyrochlores having the composition $A_{2-w-x}A'_wA''_xB_{2-y-z}B'_yB''_zO_{7-\Delta}$ wherein:
   A is a trivalent ion of an element selected from the group consisting of La, Ce, Pr, Nd, Pm, Sm, Eu, Gd, Tb, Dy, Er, Tm, Yb, Lu, Bi, Sc, Y, In, and Tl,
   A' is a trivalent ion of an element selected from the group consisting of La, Ce, Pr, Nd, Pm, Sm, Eu, Gd, Tb, Dy, Er, Tm, Yb, Lu, Bi, Sc, Y, In, and Tl, wherein A' is an element different from A, and wherein $0 \leq w \leq 1$,
   A" is a divalent ion selected from the group consisting of Mg, Ca, Sr, and Ba, and wherein $0 < x < 1$,
   B is a tetravalent ion of an element selected from the group consisting of Ti, Cr, Mn, Zr, Mo, Tc, Rh, Pd, Hf, Os, Ir, Pt, Si, Ge, Sn, and Pb,
   B' is a trivalent ion or a tetravalent ion of an element selected from the group consisting of Mo, Fe, Os, Ru, Co, Rh, Ir, Ni, Pd, Pt, Cu, Re and V, wherein B' is an element different from B, and wherein $0 < y \leq 1$,
   B" is a divalent ion, a trivalent ion, or a tetravalent ion of an element selected from the group consisting of Mg, Ca, Sr, Ba, Y, Ce, Re, Cr, Ti, Zr, Hf, Ni, Co, V, and Mo, wherein $0 \leq z < 1$ and $y+z \leq 1$, and where $\Delta$ is a number that renders the composition charge neutral,
   where an average ionic radius ratio of ions in A, A' and A"-site holding 8-fold coordination with oxygen to ions in B, B' and B"-site holding 6-fold coordination with oxygen is between 1.46 and 1.80;
   contacting the reactant gas mixture with the pyrochlore material catalyst; and
   maintaining the reactant gas mixture and the pyrochlore material catalyst at conditions of temperature, pressure and gas flow rate during the contacting to promote a catalytic reforming process and produce a gaseous mixture comprised of at least hydrogen and carbon monoxide.

2. The method of claim 1 wherein the pyrochlore material catalyst is supported on a support structure.

3. The method of claim 2, wherein the support structure is alumina, silica, or a mixed-metal oxide.

4. The method of claim 1 wherein the pyrochlore material catalyst is comprised of the one or more pyrochlores and one or more of another crystal phase including simple oxides, perovskites, fluorites, weberites.

5. The method of claim 1 wherein the pyrochlore material catalyst is a powder or a fabricated geometry.

6. The method of claim 5 wherein the fabricated geometry is a pellet, foam, honeycomb, or monolith.

7. The method of claim 1 wherein the reactant gas mixture temperature is equal to or above 150° C.

8. The method of claim 1 wherein the reactant gas mixture is comprised of natural gas.

9. The method of claim 1 wherein the reactant gas mixture is comprised of liquefied petroleum gas comprised of C2-C5 hydrocarbons.

10. The method of claim 1 wherein the reactant gas mixture is comprised of C6+ heavy hydrocarbons.

11. The method of claim 10 wherein the C6+ heavy hydrocarbons are comprised of diesel, jet fuels, gasoline, JP fuels, tars, and kerosene.

12. The method of claim 1 wherein the reactant gas mixture is comprised of oxygenated hydrocarbons.

13. The method of claim 12 wherein the oxygenated hydrocarbons are comprised of biodiesel, alcohols, and dimethyl ether.

14. The method of claim 1 wherein the reactant gas mixture is comprised of methane.

15. The method of claim 1, wherein the reactant gas mixture is comprised of diesel and the sulfur content is >14 parts per million by weight.

16. The method of claim 1, wherein the reactant gas mixture is comprised of diesel and aromatics, where the aromatic content is greater than 20 weight percent, with greater than 35 weight percent of the aromatic content being multi-ring aromatics.

17. The method of claim 1, wherein the reactant gas mixture is comprised of diesel, aromatics, and sulfur, where the aromatic content is greater than 20 weight percent, with greater than 35 weight percent of the aromatic content being multi-ring aromatics, and the sulfur content is >14 parts per million by weight.

18. The method of claim 1 wherein the reactant gas mixture has an overall oxygen to carbon atomic ratio equal to or greater than 0.9.

19. The method of claim 1 wherein the reactant gas mixture is comprised of an oxidant, and the oxidant is a highly oxidized gas stream comprised of oxidants $O_2$, $CO_2$, or $H_2O$.

20. The method of claim 1 wherein the catalytic reforming process is catalytic partial oxidation and the reactant gas mixture is comprised of an oxidant, and the oxidant is air or oxygen.

21. The method of claim 1 wherein the catalytic reforming process is steam reforming and the reactant gas mixture is comprised of an oxidant, and the oxidant is steam.

22. The method of claim 1 wherein the catalytic reforming process is oxidative steam reforming oxidant and the reactant gas mixture is comprised of an oxidant, and the oxidant is comprised of air, oxygen, and steam.

23. The method of claim 1 wherein the catalytic reforming process is $CO_2$ reforming and the reactant gas mixture is comprised of an oxidant, and the oxidant is carbon dioxide.

* * * * *